Patented Jan. 25, 1949

2,459,994

UNITED STATES PATENT OFFICE 2,459,994

QUATERNARY AMMONIUM COMPOUNDS

Melvin De Groote, University City, and Bernhard Keiser, Webster Groves, Mo., assignors to Petrolite Corporation, Ltd., Wilmington, Del., a corporation of Delaware No Drawing. Original application November 14, 1941, Serial No. 419,082. Divided and this application June 26, 1943, Serial No. 492,649

7 Claims. (Cl. 260—286)

This invention relates to a new chemical compound or composition of matter, our present application being a division of our pending application Serial No. 419,082, filed November 14, 1941, now Patent No. 2,335,262, issued November 30, 1943.

One object of our invention is to provide a new material or composition of matter, that is particularly adapted for use as a demulsifier in the resolution of crude oil emulsions, but has uses in other arts. For instance, said material is adapted for use as a break inducer in doctor treatment of the kind intended to sweeten gasoline. Certain of the compositions of matter herein described are of value as surface tension depressants in the acidification of calcareous oil-bearing strata by means of strong mineral acid, such as hydrochloric acid. Similarly, some members are effective as surface tension depressants, or wetting agents in the flooding of exhausted oil-bearing strata.

Another object of our invention is to provide a novel method for producing said new material or composition of matter.

The new material or composition of matter herein described consists of a quaternary compound of the pyridine series of the kind hereinafter described in detail. Members of the pyridine series suitable as reactants include pyridine, alkylated derivatives of pyridine, particularly alkylated derivatives, in which the alkyl radical contains three carbon atoms or less, and especially methylated pyridines, i. e., pyridines, in which one, two, or three methyl groups have been substituted in the nucleus, such as picolines, lutidines, and collidines. Also suitable as reactants are the comparable quinolines and isoquinolines, along with C-methyl homologues thereof. Coal tar bases represent mixtures of suitable heterocyclic materials which may be used as such, or after suitable purification, without separation into the individual components.

Specifically, then, the compounds herein contemplated, when employed as demulsifiers, consist of the quaternary nitrogen products obtained by reacting one mole of hydroxy compounds (hydroxylated esteramides) of the following formula:

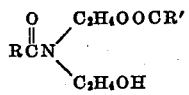

in which RCO is the acyl radical containing not more than 5 carbon atoms and R'CO is the acyl radical of a detergent-forming acid having at least 8 and not more than 32 carbon atoms, with one mole of a heterocyclic compound of the pyridine series selected from the group consisting of pyridine, quinoline, isoquinoline, and C-methyl homologues thereof, in the presence of substantially one mole of halogen hydride at an elevated temperature, the heterocyclic compound being applied in an amount substantially equivalent to the halogen hydride, and usually in excess thereof, i. e., the reaction being conducted in the presence of the free base.

The mechanical procedure employed in the manufacture of such compounds is substantially the same as used in connection with another type of reaction involving the formation of quaternary compounds by the elimination of water. See U. S. Patent No. 2,242,211, dated May 20, 1941, to Haack. See also our application Serial No. 401,375, filed June 7, 1941, now U. S. Patent No. 2,273,181, dated February 17, 1942; and our applications Serial Nos. 415,762, 415, 763, now Patent 2,329,700, Sept. 21, 1943; 415,764, now Patent 2,239,701, Sept. 21, 1943; 415,765, now Patent 2,329,702, Sept. 21, 1943; and 415,766, now Patent 2,329,703, Sept. 21, 1943, filed October 20, 1941, the above mentioned application Serial No. 415,762 now being U. S. Patent No. 2,290,417, dated July 21, 1942.

It is well known that certain nonocarboxy organic acids containing eight carbon atoms or more, and not more than 32 carbon atoms, are characterized by the fact that they combine with alkali to produce soap or soap-like materials. These detergent-forming acids include fatty acids, resin acids, petroleum acids, etc. For the sake of convenience, these acids will be indicated by the formula R'.COOH. Certain derivatives of detergent-forming acids react with alkali to produce soap or soap-like materials, and are the obvious equivalent of the unchanged or unmodified detergent-forming acids; for instance, instead of fatty acids, one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids; and of course, this is also true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms. For instance, see U. S. Patent No. 2,242,837, dated May 20, 1941, to Shields.

Although any of the high molal monocarboxy acids can be converted into esteramides of the kind described, by conventional procedure, it is our preference to employ hydroxylated esteramides derived from higher fatty acids, rather than petroleum acids, rosin acids, and the like. We have found that by far the most effective demulsifying agents are obtained from unsaturated fatty acids having 18 carbon atoms. Such unsaturated fatty acids include the higher fatty acids, such as oleic acid, ricinoleic acids, linoleic acid, linolenic acid, etc. One may employ mixed fatty acids, as, for example, the fatty acids obtained by hydrolysis of cottonseed oil, soyabean oil, corn oil, etc. Our preferred demulsifier is obtained from unsaturated fatty acids, and more especially, unsaturated fatty acids containing a hydroxyl radical or unsaturated fatty acids which have been subjected to oxidation or oxyalkylation, such as oxyethylation.

The esteramides of the kind herein described and which are employed as reactants to combine with pyridine hydrochloride or the like, may be obtained in any conventional manner. They are usually derived from the low molal acids themselves; but if desirable, the functional equivalents, such as the anhydrides, acyl chlorides, or other derivatives, may be employed. Suitable acids include, of course, acetic acid, propionic acid, butyric acid, valeric acid, etc. The amide of such low molal acid may be treated with an oxyalkylating agent, such as ethylene oxide, propylene oxide, butylene oxide, or the like, so as to produce a compound of the following type:

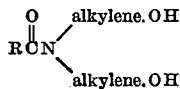

Actually, the alkylene radical might represent an equivalent divalent radical, in which the carbon atom chain is interrupted at least once by oxygen, as

—C₂H₄OC₂H₄—

Having obtained a bis (hydroxyalkyl) amide of the kind described, such compound can then be reacted in a conventional manner with a high molal acid or its equivalent, to give an esteramide, in other words, a compound of the following type:

A procedure that is frequently more readily adaptable is simply the reaction between a low molal acid, such as acetic acid, and a material of the kind exemplified by diethanolamine, dipropanolamine, or the like. For the sake of brevity, reference hereafter will be made largely to diethanolamine and acetic acid, although other suitable reactants have already been described. The method of manufacturing esteramides is so well known that no further description is required; but for convenience, the following example is given in substantially verbatim form, as it appears in U. S. Patent No. 2,238,928, dated April 22, 1941, to Cahn and Harris:

*Example A*

(1) 224 grams of methyl acetate (3 moles) and 210 grams of diethanolamine (2 moles) were mixed together, two layers forming at first, the mixture becoming a homogeneous mass after a short time. The mixture was refluxed for 19 hours, at which time 90% of the diethanolamine had reacted. A portion of the reaction mixture was subjected to a vacuum of 6 millimeters at 60 degrees C., in order to drive off the volatile material, i. e., the unreacted methyl acetate and the methyl alcohol which was formed during the reaction. The residue, upon titration, showed a content of 4.64% of free diethanolamine. To 192.5 grams of this residue, 34.7 grams of methyl acetate were added and the mixture was refluxed for 3½ hours. The resulting reaction product was then freed from its low boiling constituents, i. e., the methyl alcohol and unreacted methyl acetate, by maintaining the mass at 70 degrees C., under a pressure of 6 millimeters. The residue contained approximately 0.8% of unreacted diethanolamine, based upon a determination of the alkalinity of said residue by titration. The product was a light yellow colored syrup, soluble in water, and contained a compound which was essentially the acetic acid amide of diethanolamine, having the following formula:

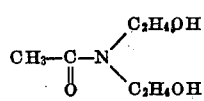

(2) 1 pound mole of the acetic acid amide of diethanolamine produced as described in part (1) hereof, and 38.0 grams (1 mole) of lauric acid were heated together for 15 minutes at approximately 200° C., while passing carbon dioxide gas through the reaction mixture. At the end of the 15 minutes, the free lauric acid has decreased to 1.3%. The product was a yellow colored syrup, dispersible in water and having good emulsifying and dispersing properties. It could be salted out of its solution by the addition thereto of sodium chloride. The product consisted essentially of a compound having the following formula:

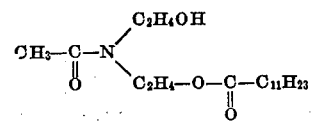

Illustrating somewhat similar types of reactions, see U. S. Patent No. 2,238,902, dated April 22, 1941, to Katzman and Harris, and also U. S. Patent No. 2,257,183, dated April 30, 1941, to Munz and Troskan.

Actually, in the manufacture of demulsifiers we have followed substantially the same procedure as above described for the manufacture of the esteramide, but have found that the most desirable compounds are obtained from unsaturated fatty acids, as previously described. Thus, we have substituted oleic acid, various mixed fatty acids, derived from unsaturated oils, such as teaseed oil, sunflower seed oil, or the like, for lauric acid in the above example. By reference to the aforementioned Haack patent, it is obvious that the formation of the quaternary compound may be indicated in the following manner:

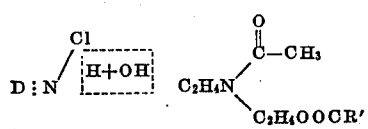

Instead of chlorine, some other halogen, such as bromine or iodine, may appear. D:N represents a heterocyclic compound of the kind previously described.

Example 1

One pound mole of the esteramide derived by reaction between equimolar portions of bis(hydroxyethyl) acetamide and ricinoleic acid is heated with 1.05 moles of pyridine hydrochloride at 140–150° C., until clearly water-soluble. The time required is generally less than one hour, and the reaction is hastened by the presence of a small amount, 1% or 2%, of free pyridine. If desired, the reaction may be conducted at a slightly higher temperature, for instance, 160–170° C. Instead of using pyridine hydrochloride, one may employ the hydrochloride of a fraction of pyridine bases, of the kind that 50% would distill over 140° C. or below, and 90% at 160° C. or below. Such selected pyridine bases are of the kind which are entirely water-soluble.

Example 2

The same procedure is followed as in Example 1, except that instead of employing an esteramide derived from ricinoleic acid, one employs a comparable compound derived from oleic acid.

Example 3

The esteramide employed as a reactant for the manufacture of the final product is derived from linseed oil fatty acids instead of ricinoleic acid or oleic acid.

The manufacture of the above compounds is usually conducted with an excess of the pyridinium base halide, such as the hydrochloride, or hydrobromide, and usually, in the presence of a significant amount of the free pyridinium base itself. In many instances, however, there is no need to use an excess of the pyridinium base halide, and, in fact, no need to have present any of the free pyridinium base itself, or, at the most, only a trace of the free base.

Sometimes the reaction with the pyridinium compound can be catalyzed by the presence of small amounts of soaps or alkalies. As is obvious, other monovalent anions may replace the halogen and serve as a functional equivalent.

The new compounds herein described have utility, not only for the purposes previously enumerated, but also find application in various industries, processes, and for various uses where wetting agents of the conventional type are used. As to some of such uses which are well known, see "The Expanding Application of Wetting Agents," Chemical Industries, volume 48, page 324 (1941). A somewhat analogous use of the material herein described is the removal of the residual mud sheath that remains after drilling a well by the rotary method, and which sometimes contains calcium carbonate that was added to the mud to make it susceptible to reaction with hydrochloric acid or the like.

We are aware that certain other derivatives similar to those herein contemplated may be derived from other esteramides, for instances, those having either an amino hydrogen atom present, or more than one hydroxyalkyl group, or a hydrocarbon radical, or two or more such functions. Note, for example, the following compounds described in the aforementioned Cahn and Harris patents:

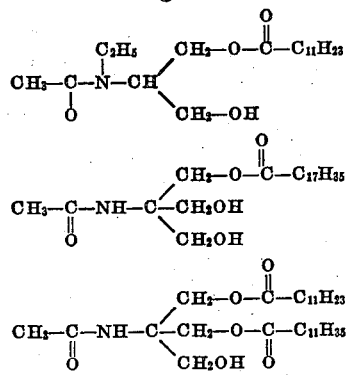

Other types not herein contemplated include derivatives of low molal polybasic carboxy acids, instead of acetic acid or the like.

Having thus described our invention, what we claim as new and desire to secure by Letters Patent is:

1. A new chemical compound of the following formula:

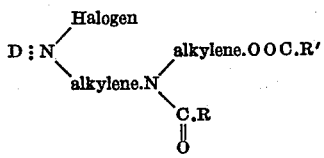

in which RCO is the acyl radical of a low molal monocarboxy acid having 5 carbon atoms or less, and R'CO is the acyl radical of a detergent-forming monocarboxy acid having at least 8 and not more than 32 carbon atoms; and D:N represents a radical of a heterocyclic compound of the pyridine series selected from the group consisting of pyridine, quinoline, isoquinoline, and C-linked methyl homologues thereof.

2. A new chemical compound of the following formula:

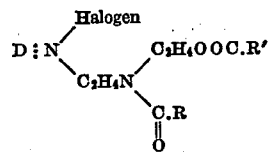

in which RCO is the acyl radical of a low molal monocarboxy acid having 5 carbon atoms or less, and R'CO is the acyl radical of a detergent-forming monocarboxy acid having at least 8 and not more than 32 carbon atoms; and D:N represents a radical of a heterocyclic compound of the pyridine series selected from the group consisting of pyridine, quinoline, isoquinoline, and C-linked methyl homologues thereof.

3. A new chemical compound of the following formula:

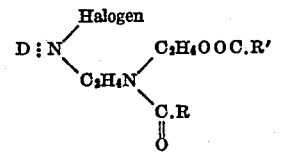

in which RCO is the acyl radical of a low molal monocarboxy acid having 5 carbon atoms or less, and R'CO is the acyl radical derived from a higher fatty acid having at least 8 and not more than 32 carbon atoms; and D:N represents a radical of a heterocyclic compound of the pyridine series selected from the group consisting of pyridine, quinoline, isoquinoline, and C-linked methyl homologues thereof.

4. A new chemical compound of the following formula:

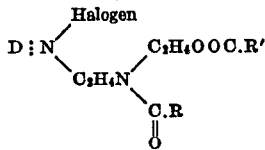

in which RCO is the acyl radical of a low molal monocarboxy acid having 5 carbon atoms or less, and R'CO is the acyl radical derived from a fatty acid having 18 carbon atoms; and D:N represents a radical of a heterocyclic compound of the pyridine series selected from the group consisting of pyridine, quinoline, isoquinoline, and C-linked methyl homologues thereof.

5. A new chemical compound of the following formula:

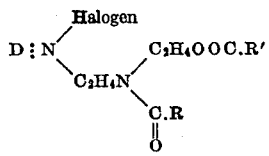

in which RCO is the acyl radical of a low molal monocarboxy acid having 5 carbon atoms or less, and R'CO is the acyl radical derived from an unsaturated fatty acid having 18 carbon atoms; and D:N represents a radical of a heterocyclic compound of the pyridine series selected from the group consisting of pyridine, quinoline, isoquinoline, and C-linked methyl homologues thereof.

6. A new chemical compound of the following formula:

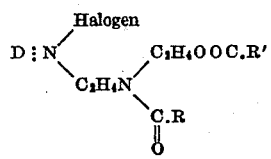

in which RCO is the acyl radical of a low molal monocarboxy acid having 5 carbon atoms or less, and R'CO represents a ricinoleyl radical; and D:N represents a radical of a heterocyclic compound of the pyridine series selected from the group consisting of pyridine, quinoline, isoquinoline, and C-linked methyl homologues thereof.

7. A new chemical compound of the following formula:

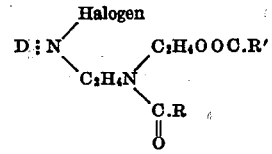

in which RCO is the acyl radical of a low molal monocarboxy acid having 5 carbon atoms or less, and R'CO represents a ricinoleyl radical and D:N represents a radical of a heterocyclic compound of the pyridine series selected from the group consisting of pyridine, quinoline, isoquinoline, and C-linked methyl homologues thereof, and in which the halogen is chlorine.

MELVIN DE GROOTE.
BERNHARD KEISER.

REFERENCES CITED

The following references are of record in the file of this patent:

UNITED STATES PATENTS

| Number | Name | Date |
| --- | --- | --- |
| 2,125,901 | Evans et al. | Aug. 9, 1938 |
| 2,146,392 | Baldwin et al. | Feb. 7, 1939 |
| 2,146,408 | Schipp | Feb. 7, 1939 |
| 2,238,927 | Cahn et al. | Apr. 22, 1941 |
| 2,242,211 | Haack | May 20, 1941 |